(12) United States Patent
Azizi et al.

(10) Patent No.: US 12,038,418 B2
(45) Date of Patent: Jul. 16, 2024

(54) SYSTEM FOR FLUSHING A GAS-MEASUREMENT DEVICE FOR ANALYZING GAS FROM A WELL, AND RELATED METHODS

(71) Applicant: Baker Hughes Oilfield Operations LLC, Houston, TX (US)

(72) Inventors: Salar Azizi, Hannover (DE); Nicklas Ritzmann, Celle (DE)

(73) Assignee: Baker Hughes Oilfield Operations LLC, Houston, TX (US)

( * ) Notice: Subject to any disclaimer, the term of this patent is extended or adjusted under 35 U.S.C. 154(b) by 242 days.

(21) Appl. No.: 16/933,663

(22) Filed: Jul. 20, 2020

(65) Prior Publication Data

US 2022/0018816 A1 Jan. 20, 2022

(51) Int. Cl.
| | |
|---|---|
| *G01N 30/00* | (2006.01) |
| *E21B 49/08* | (2006.01) |
| *G01N 30/06* | (2006.01) |
| *G01N 30/40* | (2006.01) |
| *G01N 30/02* | (2006.01) |
| *G01N 30/20* | (2006.01) |

(52) U.S. Cl.
CPC .......... *G01N 30/40* (2013.01); *E21B 49/088* (2013.01); *G01N 30/06* (2013.01); *G01N 2030/025* (2013.01); *G01N 2030/062* (2013.01); *G01N 2030/201* (2013.01); *G01N 2030/402* (2013.01)

(58) Field of Classification Search
CPC .................. G01N 2030/201; G01N 2030/202
See application file for complete search history.

(56) References Cited

U.S. PATENT DOCUMENTS 2,972,246 A * 2/1961 Reinecke ............. G01N 30/466
73/23.39
2,981,092 A * 4/1961 Marks .................... G01N 30/40
73/23.4

(Continued)

FOREIGN PATENT DOCUMENTS

| CN | 106093219 | 9/2018 |
| DE | 60033844 | * 12/2007 |

(Continued)

OTHER PUBLICATIONS

Agilent Technologies, Troubleshooting Chromatographic Contamination, 1-4, http://www.chem.agilent.com, Jul. 20, 2020.

(Continued)

*Primary Examiner* — Jamel E Williams
*Assistant Examiner* — Alex T Devito
(74) *Attorney, Agent, or Firm* — TraskBritt (57) ABSTRACT

One or more embodiments of the present disclosure include a gas-analysis system. The gas-analysis system may include a first valve, a gas-measurement device, and a second valve. The first valve may be between a sample-gas line and a sample-gas outlet. The first valve may be configured to either allow or prevent gas movement between the sample-gas line and the sample-gas outlet. The gas-measurement device operatively coupled to a testing-gas line. The second valve may be between the sample-gas line, a flushing-gas inlet, and the testing-gas line. The second valve may be configured to allow gas movement from one of the sample-gas line or the flushing-gas inlet to the testing-gas line.

19 Claims, 7 Drawing Sheets

(56) References Cited

U.S. PATENT DOCUMENTS

| | | | | |
|---|---|---|---|---|
| 3,240,068 | A | * | 3/1966 | Horeth .................. G01N 30/06 |
| | | | | 73/19.02 |
| 3,948,754 | A | * | 4/1976 | McCollum ............ C10G 1/083 |
| | | | | 208/414 |
| 4,270,564 | A | * | 6/1981 | Blackburn ............ A61M 16/00 |
| | | | | 128/205.12 |
| 4,833,915 | A | * | 5/1989 | Radd ..................... E21B 49/005 |
| | | | | 73/152.04 |
| 4,951,503 | A | * | 8/1990 | Fini ...................... G01N 33/225 |
| | | | | 73/23.35 |
| 5,057,126 | A | | 10/1991 | Lubkowitz et al. |
| 8,146,415 | B2 | | 4/2012 | Cartellieri |

FOREIGN PATENT DOCUMENTS

| | | |
|---|---|---|
| EP | 0550957 A1 | 11/1992 |
| EP | 0661537 A2 | 7/1995 |
| JP | 2019-519782 A | 7/2019 |

OTHER PUBLICATIONS

International Search Report for International Application No. PCT/US2021/070846 dated Oct. 27, 2021, 4 pages.

International Written Opinion for International Application No. PCT/US2021/070846 dated Oct. 27, 2021, 3 pages.

\* cited by examiner

SYSTEM FOR FLUSHING A GAS-MEASUREMENT DEVICE FOR ANALYZING GAS FROM A WELL, AND RELATED METHODS

TECHNICAL FIELD

Embodiments of the present disclosure relate generally to flushing a gas-measurement device for analyzing gas from a well. For example, a gas chromatograph may be configured to analyze gas from a well during drilling operations, during completion of the well, and/or while the well is producing. The gas chromatograph may be flushed to improve its ability to analyze the gas.

BACKGROUND

Drilling in the earth for natural resources (e.g., hydrocarbons, including crude oil and/or natural gas) involves using a drilling rig to drive a drill string (including a drill bit) into the earth. As the drill string descends into the earth, it creates a wellbore. In some cases, drilling fluid (sometimes referred to as mud) may be circulated into and out of the wellbore. The drilling fluid may carry earth removed by the drill bit (sometimes referred to as cuttings) out of the wellbore.

Measurement-while-drilling is a technique that involves taking various measurements of various aspects of the drilling operations while the drilling operations are ongoing. In some cases, the drilling fluid circulated out of the wellbore may be analyzed as part of a measure-while-drilling operation.

In some cases, gases exiting the wellbore, e.g., with the drilling fluid, may be analyzed. Additionally or alternatively, fluids exiting the wellbore may be vaporized and analyzed. Discovering hydrocarbons (e.g., C1 to C8 hydrocarbons) in the gases exiting the wellbore may be particularly beneficial during drilling operations because hydrocarbons exiting the wellbore may be indicative of crude oil and/or natural gas at or near the point where the drill bit is drilling (accounting for lag time). Similarly, from a safety perspective, the detected presence of sour gas (e.g., sulfur dioxide) or carbon dioxide ($CO_2$) may be indicative of a need to alter drilling fluid composition, downhole components, rig components, etc.

In a process termed "completion" a wellbore is prepared to produce natural resources as a well. Completion includes creating openings in a casing (e.g., a steel pipe that has been inserted into the wellbore) for natural resources to move into the well. Analyzing gases during the completion phase may provide information about the well. For example, hydrocarbons in gases exiting the well during the completion phase may indicate that the openings in the casing are in favorable locations for the well to produce crude oil and/or natural gas.

While a well is producing natural resources (e.g., in a phase of the well's lifecycle termed "production"), analyzing gases from the well may provide information about the well. For example, analyzing concentrations of gases exiting the well may provide information about natural resources accessible to the well.

One technique for analyzing gases (e.g., from a wellbore or well) is gas chromatography. Chromatography is a technique that may include separating various substances of a composition. The composition may be dissolved in a mobile phase which may be a liquid or a gas. The mobile phase may carry the composition through a column (e.g., one or more tubes). The column may contain a stationary phase which may line one or more sidewalls of the column. The various substances of the composition may move through the column at different speeds, e.g., based on differences in the molecular sizes of the various substances and/or based on differences in the interactions between the solid phase and the various substances.

Chromatography may include analyzing the various substances based on the speed at which they move through the column. For example, as the composition moves through the column, the various substances may be analyzed based on their various arrival times at an end of the column. Additionally, gas chromatography may provide information about concentrations of the various substances. For example, based on an amount of each substance arriving at an arrival time.

Using gas chromatography it may be possible to identify one or more gases exiting a wellbore and to provide information about concentration of the one or more gases in a gaseous composition. For example, a gas exiting a well may be a composition of various substances in various concentrations. The gas may be analyzed using gas chromatography to separate out the various substances. Various arrival times of the various substances may be compared with arrival times of known substances to identify the various substances. Further, the concentrations of the various substances in the gas may be determined based on the amounts of the various substances arriving at the various arrival times.

Information including the identities and concentrations of the various substances in gas exiting a wellbore or well may be valuable during drilling, completion, and production.

BRIEF SUMMARY

An embodiment of the present disclosure may include a gas-analysis system. The gas-analysis system may include a gas-measurement device, a first valve, and a second valve. The first valve may be between a sample-gas line and a sample-gas outlet. The first valve may be configured to either allow or prevent gas movement between the sample-gas line and the sample-gas outlet. The gas-measurement device operatively coupled to a testing-gas line. The second valve may be between the sample-gas line, a flushing-gas inlet, and the testing-gas line. The second valve may be configured to allow gas movement from one of the sample-gas line or the flushing-gas inlet to the testing-gas line. In some embodiments, the gas-measurement device may be a gas chromatograph.

Another embodiment of the present disclosure may include a method for analyzing sample gases at a gas chromatograph. The method may include, at a first time, allowing a first sample gas to move from a sample-gas line to a gas chromatograph. The method also may include, at the first time, preventing a flushing gas from moving from a flushing-gas inlet to the gas chromatograph. The method also may include, at the first time, analyzing the first sample gas at the gas chromatograph. The method also may include, at a second time, preventing the first sample gas from moving from the sample-gas line to the gas chromatograph. The method also may include, at the second time, allowing the flushing gas to move from the flushing-gas inlet to the gas chromatograph. The method also may include, at a third time, allowing a second sample gas to move from the sample-gas line to the gas chromatograph. The method also may include, at the third time, preventing the flushing gas from moving from the flushing-gas inlet to the gas chromatograph. The method also may include, at the third time, analyzing the second sample gas at the gas chromatograph.

Yet another embodiment of the present disclosure may include a well-gas analysis system. The well-gas analysis system may include: a gas trap, a first valve, a gas chromatograph, and a second valve. The gas trap may be for capturing sample gases from a well. The gas trap may be operatively coupled to a sample-gas line. The first valve may be between the sample-gas line and a sample-gas outlet. The first valve may be configured to either allow or prevent gas movement between the sample-gas line and the sample-gas outlet. The gas chromatograph may be operatively coupled to a testing-gas line. The second valve may be between the sample-gas line, a flushing-gas inlet, and the testing-gas line. The second valve may be configured to allow gas movement from one of the sample-gas line or the flushing-gas inlet to the testing-gas line.

BRIEF DESCRIPTION OF THE SEVERAL VIEWS OF THE DRAWINGS

While the specification concludes with claims particularly pointing out and distinctly claiming that which is regarded as the present invention, various features and advantages of embodiments of the disclosure may be more readily ascertained from the following description of embodiments of the disclosure when read in conjunction with the accompanying drawings.

DETAILED DESCRIPTION

The illustrations presented herein are not meant to be actual views of any particular flushing system, well-gas analysis system, or gas-analysis system or component thereof, but are merely conceptual representations employed to describe illustrative embodiments. The drawings are not to scale. For clarity in description, various features and elements common among the illustrated embodiments may be referenced with the same or similar reference numerals.

In some fields of endeavor it may be advantageous to be able to test multiple compositions using a chromatography system on the multiple compositions in succession. For example, during the drilling of a wellbore, it may be advantageous to analyze gases from the wellbore at multiple times and/or drilling depths. As another example, during completion of a well, it may be advantageous to analyze gases from the well during multiple stages of the completion operation. Additionally, during a production phase of a well, it may be advantageous to analyze gases from the well at multiple times, e.g., to evaluate production of the well.

As a particular example, during drilling operations, gas may continuously exit the wellbore. For example, gases may be exiting the well along with drilling fluids. The gas exiting the wellbore may be indicative of downhole conditions of the bottom hole assembly (BHA e.g., bit metamorphism), and reservoir fluids and characteristics (such as, but not limited to, porosity, saturation, and permeability) during ongoing drilling. Information about downhole conditions at particular depths, and/or at the current depth (accounting for lag time) may be valuable to the drilling operation and/or to later operation of the well. Thus, analyzing the gas exiting the wellbore at frequent intervals may be advantageous for safety, hydrocarbon production, and/or reservoir characterization.

Figure 1:
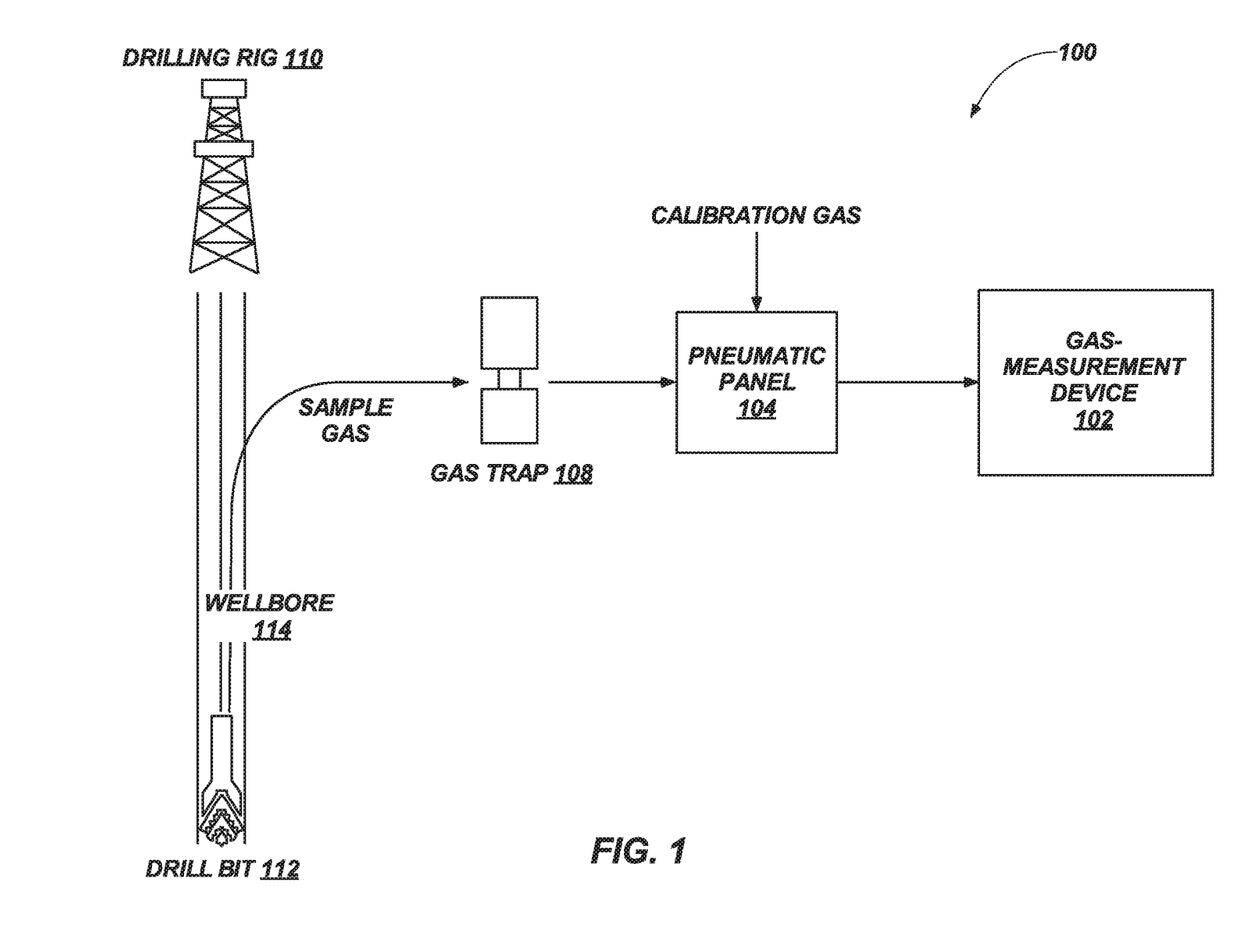
FIG. 1 is a functional block diagram of a well-gas analysis system.

As an example of an environment in which embodiments of the present disclosure may be used, FIG. 1 is a functional block diagram of a well-gas analysis system 100 that may be configured to analyze gases exiting a wellbore during drilling. The well-gas analysis system 100 comprises a gas-measurement device 102, a pneumatic panel 104, and a gas trap 108. In some embodiments, the well-gas analysis system 100 may include and/or be arranged in an environment including a drilling rig 110, a drill bit 112, and a wellbore 114.

The gas-measurement device 102 may include any suitable measurement device for a gas-analysis system. As a specific example, the gas-measurement device may include a gas chromatograph. Additional examples of suitable measurement devices include: a mass spectrometer, a liquid chromatography detector including: a charged aerosol detectors (CAD) or a evaporative light scattering detector (ELSD), and a gas chromatograph including: a flame ionization detector (FID), a flame photometric detector (FPD), a nitrogen phosphorus detector (NPD), an atomic-emission detector (AED), or a Thermal conductivity detector (TCD). Additionally or alternatively, the gas-measurement device 102 may include other detectors such as an infrared (IR) or near infrared (NIR) hotwire detector or a Raman spectrometer.

In some embodiments, the gas-measurement device 102 may include a column (e.g., one or more tubes) lined with a stationary phase (e.g., a polysiloxane). The gas-measurement device 102 may also include a mobile phase (e.g., an inert or unreactive gas such as helium and/or nitrogen). The gas-measurement device 102 may include a source of the mobile phase and a module for sampling and mixing the mobile phase with the sample gases either in single or multiple steps. For example, the gas-measurement device 102 may include a point at which a line carrying the sample gas converges with a line carrying the mobile phase. As another example, the gas chromatograph may include multiple valves in series for mixing the mobile phase with the sample gases.

The pneumatic panel 104 may be configured to regulate pressure in the well-gas analysis system 100. Specifically, the pneumatic panel 104 may be configured to regulate pressure of sample gases moving into the gas-measurement device 102. Additionally, the pneumatic panel 104 may be configured to regulate the composition of sample gas moving into the well-gas analysis system 100. For example, the pneumatic panel 104 may include filtration and/or another means to remove moisture and/or contaminants from the sample gas.

The pneumatic panel 104 (or another element of the well-gas analysis system 100) may include means for partitioning gas exiting the well into different samples which may be referred to herein as sample gases. For example, the means for portioning the gas may include a configuration of one or more valves, tubes, lines, channels, pumps, and/or chambers. The sample gases may be from the same source (e.g., the wellbore 114) and may include the same substances. The sample gases may only be distinct in that they may be received at different times. For example, the pneumatic panel 104 may include one or more channels and/or injection valves for conveying the sample gases into the gas-measurement device 102.

FIG. 1 also includes calibration gas entering the pneumatic panel 104. The calibration gas may be used to calibrate the well-gas analysis system 100, including the gas-measurement device 102. For example, in some embodiments, the calibration gas may include one or more gases which the well-gas analysis system 100 may be intended to accurately detect. For example, the calibration gas may include hydrocarbons (e.g., C1 to C8 hydrocarbons). In these or other embodiments, the calibration gases may be used to derive arrival times for the calibration gases for the well-gas analysis system 100.

Additionally or alternatively, in some embodiments, calibration gas may be injected into the well-gas analysis system 100 until readings at the gas-measurement device 102 are stable. For example, when the well-gas analysis system 100 is being installed or analysis operations are being initiated, the calibration gas may be injected into the well-gas analysis system 100 until the readings of the gas-measurement device 102 are stable.

The pneumatic panel 104 may include one or more gas pumps that may be configured to regulate pressure and/or move gases from the gas trap 108 to the pneumatic panel 104 and/or into the gas-measurement device 102. In some embodiments, the well-gas analysis system 100 may include more or fewer gas pumps than are illustrated in FIG. 1.

The gas trap 108 may be configured to capture gases exiting the wellbore 114. In some embodiments, the gas trap 108 may be included in a mud processing, recycling, or logging system. The gas trap 108 may be configured to operate on a well in any lifecycle. For example, the gas trap 108 may be configured to operate during drilling to capture gases (e.g., from mud), during completion of the well, and during production. As one example, the gas trap 108 may be included in or used in connection with a production tree. The production tree may include one or move valves that may be installed on a well in production that may be configured to regulate pressure and/or production of the well.

The drilling rig 110 may be configured to drive the drill bit 112 (which may be at the end of the drill string) into the formation to form the wellbore 114. As has been described, the drilling rig 110, the drill bit 112, and the wellbore 114 are given as part of an example environment in which embodiments of the present disclosure may be used.

The well-gas analysis system 100 may be configured to test multiple sample gases in succession. For example, the well-gas analysis system 100 may be configured to operatively couple a first channel including a first sample gas to the gas-measurement device 102 to analyze a first sample gas at the gas-measurement device 102. Thereafter, the well-gas analysis system 100 may be configured to operatively couple a second channel including a second sample gas to the gas-measurement device 102 to analyze a second sample gas at the gas-measurement device 102. As has been described, the first sample gas and the second sample gas may be from the same source, e.g., the wellbore 114. Additionally, the first sample gas and the second sample gas may have been captured at different times. Additionally or alternatively, the sample gases may include one or more calibration gases.

Due to the nature of gas analysis, e.g., gas chromatography (i.e., gases traveling through a column at different speeds), it may take time for gases in the well-gas analysis system 100 (e.g., in a sample-gas line and/or in the column of a gas chromatograph) to move through the well-gas analysis system 100. Specifically, after the first sample gas has been analyzed, it may take time for the first sample gas to move completely through the well-gas analysis system 100. If the second channel is operatively coupled to the gas-measurement device 102 prior to the first sample gas clearing the well-gas analysis system 100 the analysis of the second sample gas may be tainted by remnants of the first sample gas. Remnants of prior gases are sometimes termed "carry over."

Systems and methods of the present disclosure may provide improvements to a gas-analysis system. Specifically, systems and methods of the present disclosure may include a flushing system that may improve the ability of a gas-analysis system to analyze two or more sample gases in succession. For example, the flushing system may allow gases to be analyzed in succession at a quicker rate (e.g., a shorter delay between analyzing a first sample gas and a second sample gas). Additionally or alternatively, the flushing system may allow gases to be analyzed more accurately (e.g., with less contamination from carry over). For example, the flushing system may be configured to flush gas (e.g., the first sample gas) from the gas chromatograph allowing the gas chromatograph to switch from analyzing the first sample gas to analyzing the second sample gas quicker and/or with less carry over. Additionally or alternatively, the flushing system may improve calibration of the gas-measurement system e.g., by flushing a first calibration gas through the gas-measurement system before a second calibration gas is provided to the gas-measurement system.

An improvement in the ability of a gas-analysis system to analyze gases in succession may be particularly beneficial in an environment where analyzing gases frequently may be beneficial. For example, in a well drilling environment, gases may be arriving continuously and accurate and frequent analysis of gas samples may benefit the drilling operation. As a specific example, mud-gas analysis may be ongoing during a well-drilling operation. The systems and methods of the present disclosure may improve the accuracy of the mud-gas analysis and/or the rate at which gas samples are analyzed. Improving the rate at which samples are analyzed may allow for more samples to be analyzed per hour of drilling time (which may relate to more samples per meter of well depth). Improved accuracy and having more samples available for analysis may allow for better reservoir analysis.

Figure 2:
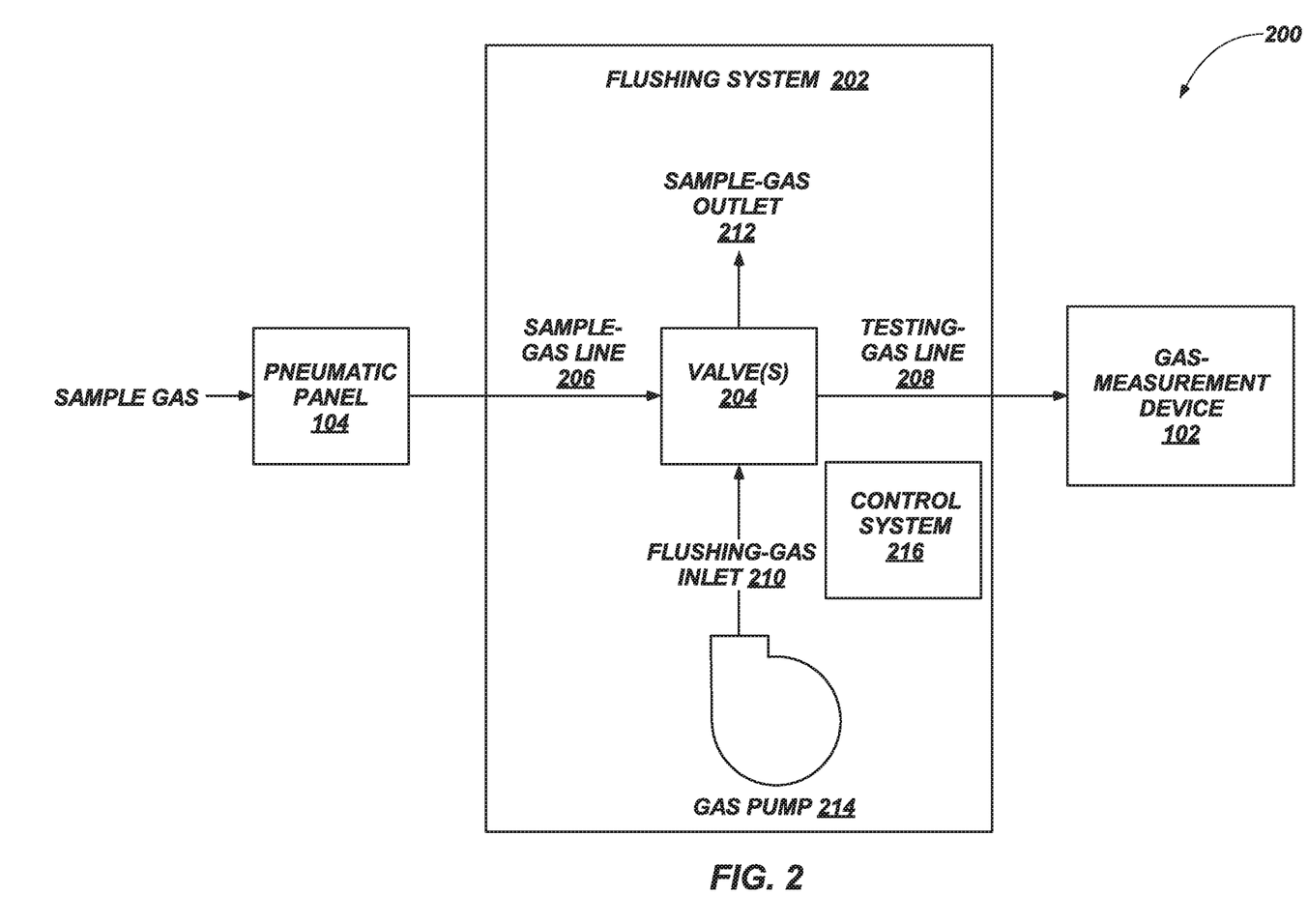
FIG. 2 is a functional block diagram of an example gas-analysis system in accordance with one or more embodiments of the present disclosure.

FIG. 2 is a functional block diagram of an example gas-analysis system 200 in accordance with one or more embodiments of the present disclosure. Specifically, the gas-analysis system 200 may include a flushing system 202 which may provide an improvement over the well-gas analysis system 100 of FIG. 1. The gas-analysis system 200 includes a gas-measurement device 102, and a pneumatic panel 104 which may be substantially the same as described above with reference to FIG. 1.

The flushing system 202 may be configured to flush sample gases from the gas-analysis system 200 (including the gas-measurement device 102) to improve the ability of the gas-analysis system 200 to analyze the sample gases in succession. For example, the gas-analysis system 200 may be configured to analyze a first sample gas, then a second sample gas. In between sampling the first sample gas and the second sample gas, the flushing system 202 may be configured to flush the first sample gas from the gas-analysis system 200 (including the gas-measurement device 102). The flushing system 202 includes valve(s) 204, a sample-gas line 206, a testing-gas line 208, a flushing-gas inlet 210, a sample-gas outlet 212, a gas pump 214, and a control system 216.

In some embodiments, the flushing system 202 may be configured to flush samples gases that are from a well in between successive well-gas samplings. In these or other embodiments, the flushing system 202 may additionally or alternatively be configured to flush calibration gases that are used as part of the calibration of the gas-analysis system 200. For example, a first calibration gas may be supplied to the gas-measurement device 102 as part of a calibration process. After the readings from the gas-measurement device 102 have stabilized, a second calibration gas may be provided. In between providing the first calibration gas and providing the second calibration gas, a flushing gas may be provided (by the flushing system 202) to flush the first calibration gas from the gas-analysis system 200 (including the gas-measurement device 102). Flushing the first calibration gas from the gas-analysis system 200 may allow readings of the gas-measurement device 102 to stabilize more quickly and/or using less of the second calibration gas than would be possible without using the flushing gas. Thus, the flushing system 202 may improve calibration operation by saving time and/or calibration gases.

The valve(s) 204 may include one or more valves configured to alternately allow and prevent gas movement through the valve(s) 204. The valve(s) 204 may include one or more instances of two-way valves, three-way valves, four-way valves, and/or multi-way valves. In the present disclosure, the term "multi-way valves" may refer to valve with three or more inlets and/or outlets. Three-way valves, four-way valves, and five-way valves are examples of a multi-way valve. Multi-way valves might be used, where several different flushing gases are required, depending on the gases to be measured. Two examples of configurations of the valve(s) 204 are illustrated and described with reference to FIG. 3 and FIG. 4, respectively. Two examples of valves that may make up the valve(s) 204 are illustrated and described with reference to FIG. 5 and FIG. 6, respectively. In some embodiments, the valve(s) 204 may include actuators configured to be controlled by an electrical signal from the control system 216.

The sample-gas line 206, the testing-gas line 208, the flushing-gas inlet 210, and the sample-gas outlet 212 may include various locations, lines, connectors, inlets, and/or outlets in the flushing system 202 for receiving, conveying, or providing gas into and/or out of the flushing system 202. In some embodiments, the sample-gas line 206, the testing-gas line 208, the flushing-gas inlet 210 and the sample-gas outlet 212 may include means for conveying gas, e.g., a gas line. In some embodiments, the sample-gas line 206, the testing-gas line 208, the flushing-gas inlet 210 and the sample-gas outlet 212 may include means for connecting the flushing system 202 to various sources or destinations for gas. For example, the sample-gas line 206, the testing-gas line 208, the flushing-gas inlet 210, and the sample-gas outlet 212 may include any suitable inlet or connector. Examples of suitable inlets include: a split/splitless injector (S/SL), an on-column inlet, a purge-and-trap (P/T) system, a (PTV) injector, a gas source inlet and a gas-switching valve. Examples of suitable connectors include: ACME standard connectors, Autogas standard connectors, Bayonet standard connectors, National Pipe Thread (NPT) standard connectors, International Standards Organization (ISO) standard connectors, Unified Fine Tread Series (UNF) standard connectors, SWAGELOK® standard connectors, PARKER® standard connectors, and FESTO® standards connectors.

The sample-gas line 206 may include a location for receiving gas from the pneumatic panel 104. The sample-gas line 206 may include a line for carrying gas between the pneumatic panel 104 and the valve(s) 204.

The testing-gas line 208 may include a location for providing gas to the gas-measurement device 102. The testing-gas line 208 may include a line for carrying gas between the valve(s) 204 and the gas-measurement device 102.

The flushing-gas inlet 210 may include one or more locations for receiving gas. The flushing-gas inlet 210 may be configured to receive flushing gas from one or more flushing-gas sources. The flushing-gas sources may include one or more containers (e.g., pressurized or non-pressurized) of flushing gas (e.g., compressed or uncompressed) and/or inert gas pumps. The flushing gas may include a pressurized gas or gas mix, e.g., zero air. The flushing gas may include an inert or unreactive gas, for example, helium or nitrogen. Additionally or alternatively, the flushing gas may be air (e.g., from the environment of the gas-analysis system 200). Specifically, air that doesn't contaminate the subsequent sample gas (e.g., by including gases that will obscure or mask analysis results) may be used to flush the gas-analysis system 200 (including the gas-measurement device 102).

In some embodiments, the flushing system 202 may include a gas pump 214 which may be configured to regulate pressure and/or gas movement into the flushing system 202 through the flushing-gas inlet 210. Specifically, the gas pump 214 may be configured to regulate pressure and flow of flushing gas into the flushing system 202. The gas pump 214 may include a pump for pushing gas and/or a vacuum pump for sucking gas.

The sample-gas outlet 212 may include a location for allowing gas to exit the flushing system 202 and/or the gas-analysis system 200. Gases may be vented out of the gas-analysis system 200 at the sample-gas outlet 212. In some embodiments, the sample-gas outlet 212 may include one or more filters for cleaning gas before the gas exits the gas-analysis system 200.

In some embodiments, the flushing system 202 may include a control system 216 that may be configured to control operations of the flushing system 202. For example, the control system 216 may be configured to control the valve(s) 204 to control gas movement through the flushing system 202. As two specific examples, the control system 216 may be configured to configure the valve(s) 204 into a testing mode as will be illustrated and described in more detail with reference to FIG. 3 and a flushing mode as will be illustrated and described in more detail with reference to FIG. 4. Additionally or alternatively, the control system 216 may be configured to control the gas pump 214. In some embodiments, the control system 216 may be configured to control the gas-measurement device 102. In other embodiments, the control system 216 may be controlled by, or receive control signals from the gas-measurement device 102 and/or a controller that controls the gas-measurement device 102 and the flushing system 202.

In some embodiments, the control system 216 may include any suitable computing system. Control system 216 may include one or more central processing units (CPUs)

configured to execute computing instructions. When executing computing instructions, the one or more CPUs may be understood to be special/specific purpose processing units, for example, when executing instructions the one or more CPUs may be understood to be the control system 216. In some embodiments, CPUs may include logic circuitry (e.g., logic gates, without limitation) for implementing control system 216.

In some embodiments, the gas-analysis system 200, or one or more elements thereof, may be configured to be used above-ground. For example, the flushing system 202 and the gas-measurement device 102 may be positioned above-ground and the gas-analysis system 200 may include a gas-extraction unit configured to extract sample gases from drilling mud at the surface, (e.g., the gas trap 108 of FIG. 1). As another example, the gas-analysis system 200 may include a production tree and the gas-analysis system 200 may include a gas trap configured to obtain sample gases from the production tree e.g., during production operations.

In some embodiments, the gas-analysis system 200, or one or more elements thereof, may be configured to be used below-ground. For example, the flushing system 202 and the gas-measurement device 102 may be positioned below-ground and the gas-analysis system 200 may include a gas-capture unit configured to obtain a sample gas below-ground. Additionally or alternatively, the gas-analysis system 200, or one or more elements thereof, may be implemented in, or included in, a downhole tool. For example, one or more elements of the gas-analysis system 200 may be implemented in a flowline string, a casing string, and a production string a wireline tool, completion tool, or drilling tool. In these or other embodiments, the gas trap (e.g., the gas trap 108 of FIG. 1) may be and/or include a membrane and/or a micro-scale degassing chamber. Being able to measure an in situ downhole reservoir fluid composition may be advantageous for analysis of the reservoir. Therefore, in some embodiments, it may be beneficial to use one or more elements of the gas-analysis system 200 in the downhole sampling and measurement processes. For example, sample gases that may be analyzed by the gas-analysis system 200 may be obtained from sample fluid may be pumped from the formation in a stationary deployment or extracted from the mud through a membrane or a micro-scale degassing chamber for separation of gas from drilling fluid in stationary or moving position. In these or other embodiments, one or more of the gas trap 108, the pneumatic panel 104, the flushing system 202, and/or the gas-measurement device 102 may be positioned in the wellbore 114. Additional detail regarding a downhole tool can be found in U.S. Pat. No. 8,146,415B2 which is incorporated herein in its entirety.

Figure 3:
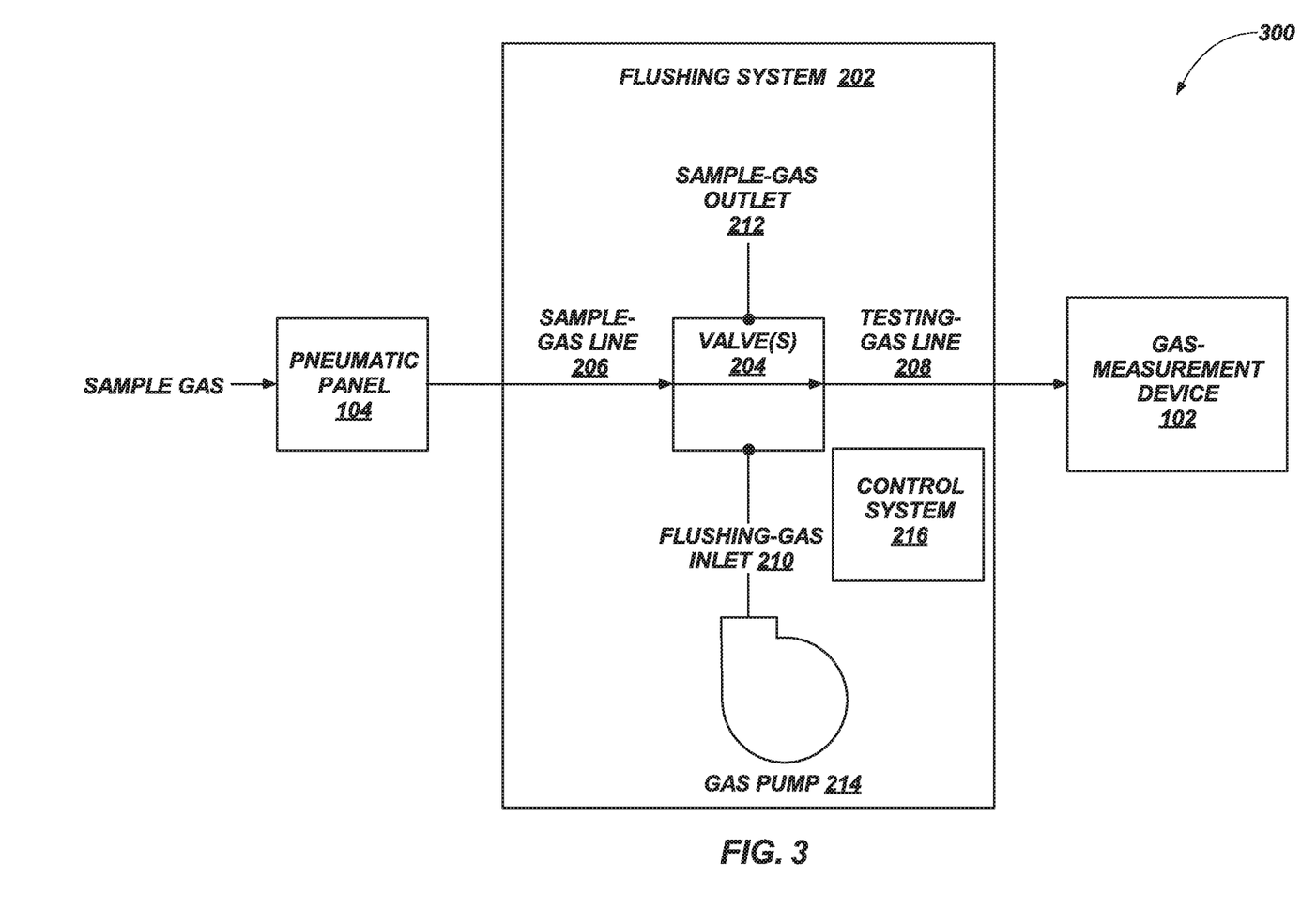
FIG. 3 is a functional block diagram of the gas-analysis system of FIG. 2 in a testing mode of operation in accordance with one or more embodiments of the present disclosure.

FIG. 3 is a functional block diagram of a gas-analysis system 300, which may be the gas-analysis system 200 of FIG. 2 configured in a testing mode of operation in accordance with one or more embodiments of the present disclosure. Specifically, the valve(s) 204 of gas-analysis system 300 are configured such that the sample-gas line 206 is operatively coupled to the gas-measurement device 102 and the flushing-gas inlet 210 is not operatively coupled to the gas-measurement device 102.

In the testing mode of operation, the flushing system 202 may be configured to allow sample gas to be analyzed at the gas-measurement device 102. For example, sample gas may arrive at the flushing system 202 from the pneumatic panel 104. The sample gas may be allowed to flow through the testing-gas line 208 to the gas-measurement device 102. Additionally, the flushing gas may be prevented from flowing to the gas-measurement device 102.

Figure 4:
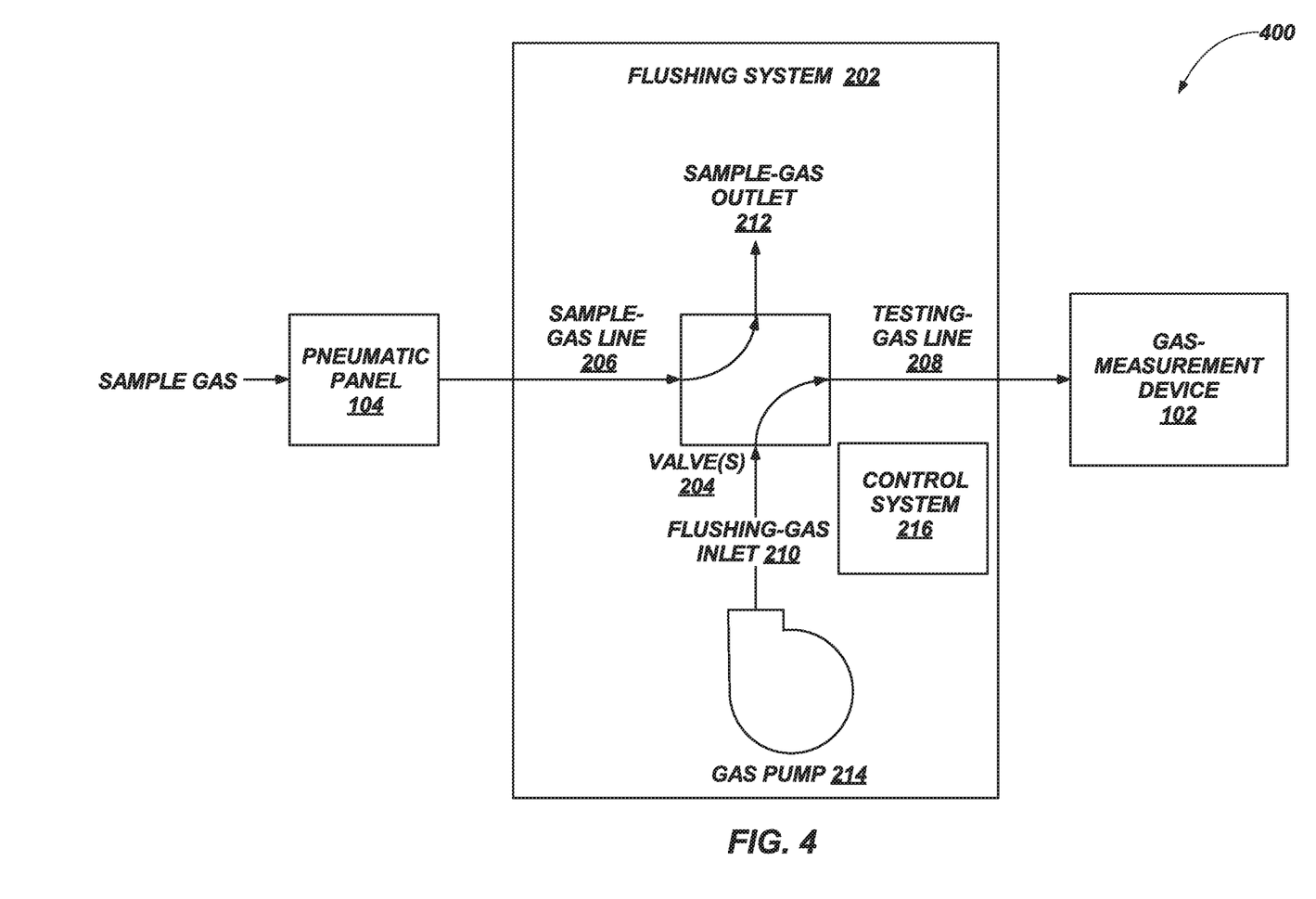
FIG. 4 is a functional block diagram of the gas-analysis system of FIG. 2 in a flushing mode of operation in accordance with one or more embodiments of the present disclosure.

FIG. 4 is a functional block diagram of a gas-analysis system 400, which may be the gas-analysis system 200 of FIG. 2 in a flushing mode of operation in accordance with one or more embodiments of the present disclosure. Specifically, the valve(s) 204 of gas-analysis system 400 are configured such that the flushing-gas inlet 210 is operatively coupled to the gas-measurement device 102 and the sample-gas line 206 is not operatively coupled to the gas-measurement device 102.

In the flushing mode of operation, the flushing system 202 may be configured to allow (or cause) the flushing gas to flow through the gas-measurement device 102. The flushing gas flowing through the gas-measurement device 102 may flush carry over gas from a previous analysis through the gas-measurement device 102, preparing the gas-measurement device 102 for another sample gas.

In the flushing mode of operation, the flushing system 202 may operatively couple the flushing-gas inlet 210 with the testing-gas line 208 and operatively decouple the sample-gas line 206 from the testing-gas line 208. Additionally, in the flushing mode of operation, the flushing system 202 may operatively couple the sample-gas line 206 to the sample-gas outlet 212 which may allow the sample gas to vent out of the gas-analysis system 400. Additionally, in some embodiments, in the flushing mode of operation, the gas pump 214 may cause the flushing gas to move through the testing-gas line 208 and/or through the gas-measurement device 102.

Figure 5:
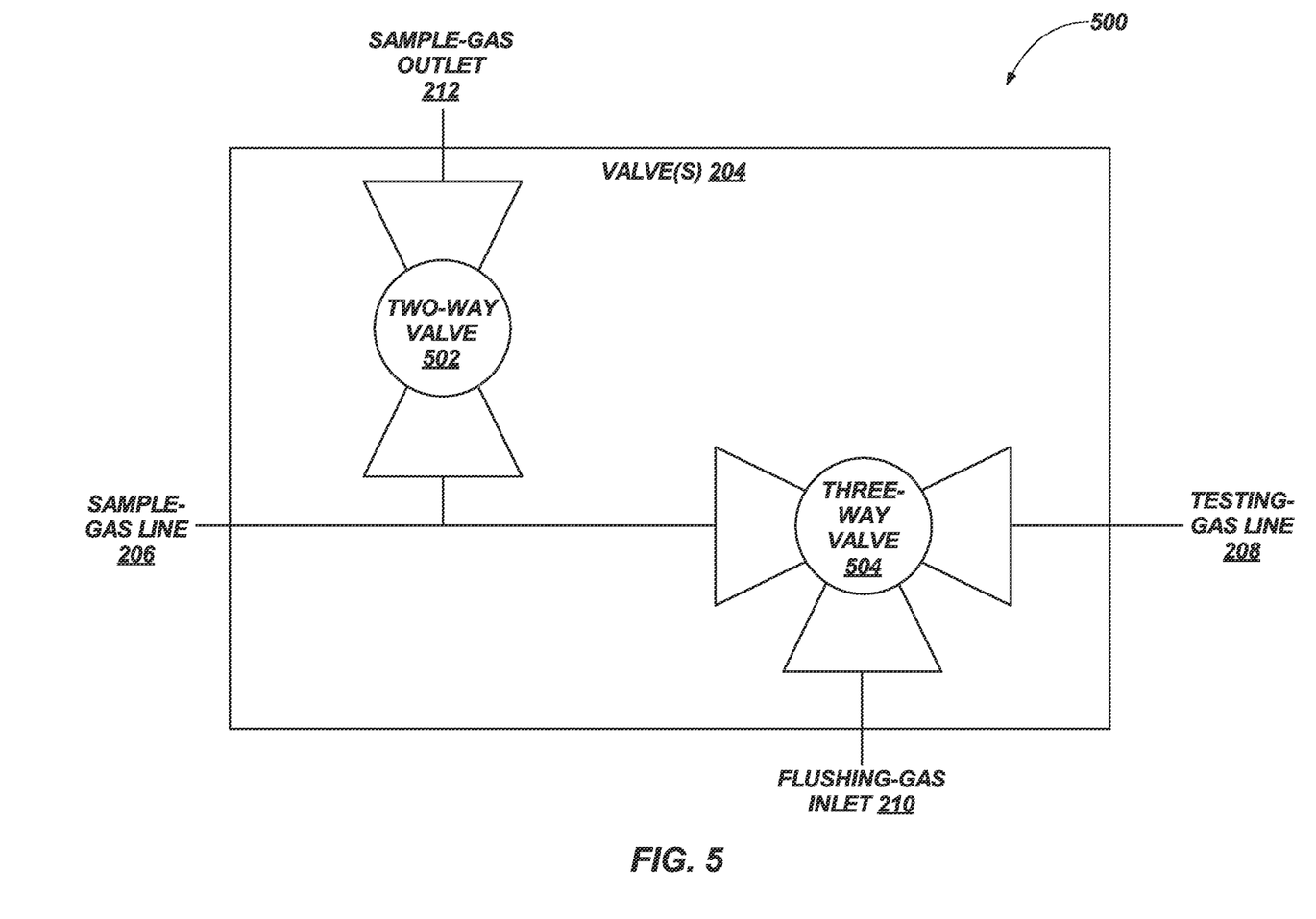
FIG. 5 is a functional block diagram of an example flushing system in accordance with one or more embodiments of the present disclosure.

FIG. 5 is a functional block diagram of an example flushing system 500 in accordance with one or more embodiments of the present disclosure. In particular, the flushing system 500 of FIG. 5 illustrates one example embodiment of valves that may be configured as or to operate according to one or more embodiments of the present disclosure.

The flushing system 500 includes valve(s) 204, including a two-way valve 502 and a three-way valve 504, which may be an example of the valve(s) 204 described above with reference to FIG. 2. The flushing system 500 also includes a sample-gas line 206, which may be substantially the same as the sample-gas line 206 described above with reference to FIG. 2. The flushing system 500 also includes, a testing-gas line 208, which may be substantially the same as the testing-gas line 208 described above with reference to FIG. 2. The flushing system 500 also includes a flushing-gas inlet 210, which may be substantially the same as the flushing-gas inlet 210 described above with reference to FIG. 2. The flushing system 500 also includes, and a sample-gas outlet 212, which may be substantially the same as the sample-gas outlet 212 described above with reference to FIG. 2.

As an example of contemplated operation of the flushing system 500, in a testing mode of operation (e.g., as illustrated and described above with reference to FIG. 3), the three-way valve 504 may be configured to operatively couple the sample-gas line 206 with the testing-gas line 208. Operatively coupling the sample-gas line 206 with the testing-gas line 208 may allow a sample gas to flow through the flushing system 202 to be analyzed at a gas chromatograph (e.g., the gas-measurement device 102 of FIG. 2).

Additionally, in the testing mode of operation, the three-way valve 504 may be configured to decouple the flushing-gas inlet 210 from the testing-gas line 208. Decoupling the flushing-gas inlet 210 from the testing-gas line 208 may prevent a flushing gas from moving into the testing-gas line 208 and subsequently into the gas-measurement device 102. Decoupling the flushing-gas inlet 210 from the testing-gas line 208 may include stopping gas movement at the flushing-gas inlet 210 such that no flushing gas moves into the flushing system 500.

Additionally, in the testing mode of operation, the two-way valve 502 may be configured to decouple the sample-gas line 206 from the sample-gas outlet 212. Decoupling the sample-gas line 206 from the sample-gas outlet 212 may prevent the sample gas from moving out of the flushing system 500 at the sample-gas outlet 212.

As another example of contemplated operation of the flushing system 500, in a flushing mode of operation (e.g., as illustrated and described above with reference to FIG. 4), the three-way valve 504 may be configured to operatively couple the flushing-gas inlet 210 with the testing-gas line 208. Operatively coupling the flushing-gas inlet 210 with the testing-gas line 208 may allow a flushing gas to flow through the flushing system 202 to flush gas from the gas chromatograph.

Additionally, in the flushing mode of operation, the three-way valve 504 may be configured to decouple the sample-gas line 206 from the testing-gas line 208. Decoupling the sample-gas line 206 from the testing-gas line 208 may prevent the sample gas from moving to the sample-gas outlet 212 and subsequently the gas chromatograph. Preventing the sample gas from moving to the gas chromatograph may allow the gas chromatograph to be flushed of gas in preparation for analysis of a subsequent gas.

Additionally, in the flushing mode of operation, the two-way valve 502 may be configured to operatively couple the sample-gas line 206 to the sample-gas outlet 212. Operatively coupling the sample-gas line 206 to the sample-gas outlet 212 may allow the sample gas to move out of the flushing system 500 at the sample-gas outlet 212.

Figure 6:
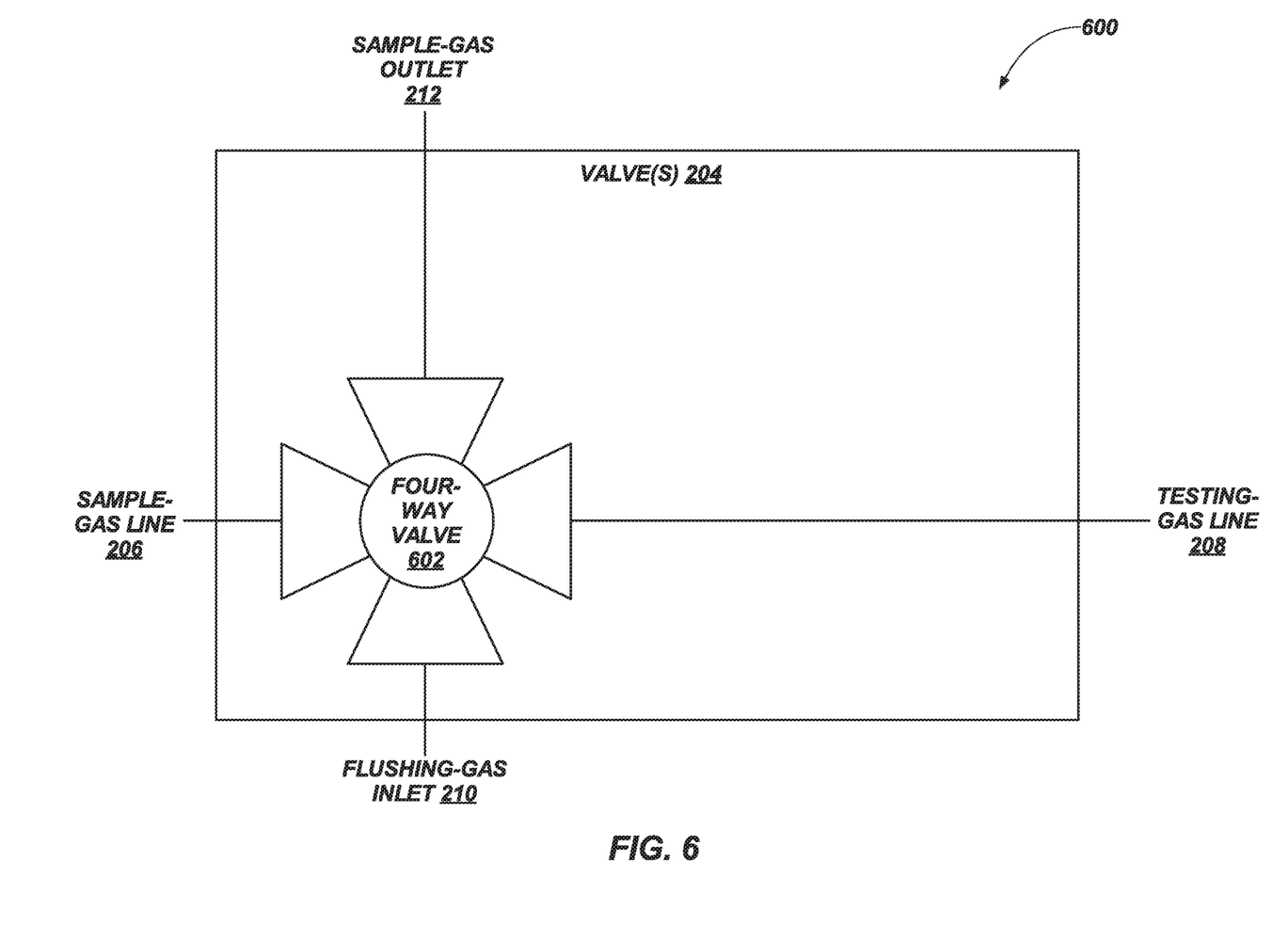
FIG. 6 is a functional block diagram of another example flushing system in accordance with one or more embodiments of the present disclosure.

FIG. 6 is a functional block diagram of another example flushing system 600 in accordance with one or more embodiments of the present disclosure. In particular, the flushing system 600 of FIG. 6 illustrates another example embodiment of valves that may be configured as or to operate according to one or more embodiments of the present disclosure.

The flushing system 600 includes valve(s) 204, including a four-way valve 602, which may be an example of the valve(s) 204 described above with reference to FIG. 2. The flushing system 600 also includes a sample-gas line 206, which may be substantially the same as the sample-gas line 206 described above with reference to FIG. 2. The flushing system 600 also includes, a testing-gas line 208, which may be substantially the same as the testing-gas line 208 described above with reference to FIG. 2. The flushing system 600 also includes a flushing-gas inlet 210, which may be substantially the same as the flushing-gas inlet 210 described above with reference to FIG. 2. The flushing system 600 also includes, and a sample-gas outlet 212, which may be substantially the same as the sample-gas outlet 212 described above with reference to FIG. 2.

As an example of contemplated operation of the flushing system 600, in a testing mode of operation (e.g., as illustrated and described above with reference to FIG. 3), the four-way valve 602 may be configured to operatively couple the sample-gas line 206 with the testing-gas line 208. Operatively coupling the sample-gas line 206 with the testing-gas line 208 may allow a sample gas to flow through the flushing system 202 to be analyzed at a gas chromatograph (e.g., the gas-measurement device 102 of FIG. 2).

Additionally, in the testing mode of operation, the four-way valve 602 may be configured to decouple the flushing-gas inlet 210 from the testing-gas line 208. Decoupling the flushing-gas inlet 210 from the testing-gas line 208 may prevent a flushing gas from moving into the testing-gas line 208 and subsequently into the gas-measurement device 102. Decoupling the flushing-gas inlet 210 from the testing-gas line 208 may include stopping gas movement at the flushing-gas inlet 210 such that no flushing gas moves into the flushing system 600.

Additionally, in the testing mode of operation, the four-way valve 602 may be configured to decouple the sample-gas line 206 from the sample-gas outlet 212. Decoupling the sample-gas line 206 from the sample-gas outlet 212 may prevent the sample gas from moving out of the flushing system 600 at the sample-gas outlet 212.

As another example of contemplated operation of the flushing system 600, in a flushing mode of operation (e.g., as illustrated and described above with reference to FIG. 4), the four-way valve 602 may be configured to operatively couple the flushing-gas inlet 210 with the testing-gas line 208. Operatively coupling the flushing-gas inlet 210 with the testing-gas line 208 may allow a flushing gas to flow through the flushing system 202 to flush gas from the gas chromatograph.

Additionally, in the flushing mode of operation, the four-way valve 602 may be configured to decouple the sample-gas line 206 from the testing-gas line 208. Decoupling the sample-gas line 206 from the testing-gas line 208 may prevent the sample gas from moving to the sample-gas outlet 212 and subsequently the gas chromatograph. Preventing the sample gas from moving to the gas chromatograph may allow the gas chromatograph to be flushed of gas in preparation for analysis of a subsequent gas.

Additionally, in the flushing mode of operation, the four-way valve 602 may be configured to operatively couple the sample-gas line 206 to the sample-gas outlet 212. Operatively coupling the sample-gas line 206 to the sample-gas outlet 212 may allow the sample gas to move out of the flushing system 600 at the sample-gas outlet 212.

The examples given with reference to FIG. 5 and FIG. 6 are merely two contemplated examples. Other embodiments are possible and are within the scope of this disclosure. As one specific example of such an embodiment, the valve(s) 204 may include three two-way valves configured to allow and prevent gas movement as described herein. Specifically, the contemplated embodiment may include a first two-way valve between the sample-gas line 206 and the testing-gas line 208, a second two-way valve between the sample-gas line 206 and the sample-gas outlet 212 and a third two-way valve between the flushing-gas inlet 210 and the testing-gas line 208.

Additionally, the flushing-gas inlet 210 illustrated in FIG. 5 and FIG. 6 includes only a single line. In some embodiments, the flushing-gas inlet 210 may include multiple gas lines e.g., to provide multiple different flushing gases. Accordingly, the valve(s) 204 may include a multi-way valve or a series of valves for connecting the flushing-gas inlet 210 to the other lines of the valve(s) 204. As a specific example, the flushing-gas inlet 210 may include two lines and the valve(s) 204 may include a five-way valve in place of the four-way valve 602. The five-way valve may be positioned between the sample-gas line 206, the sample-gas outlet 212, the testing-gas line 208, and the two lines of the flushing-gas inlet 210.

Figure 7:
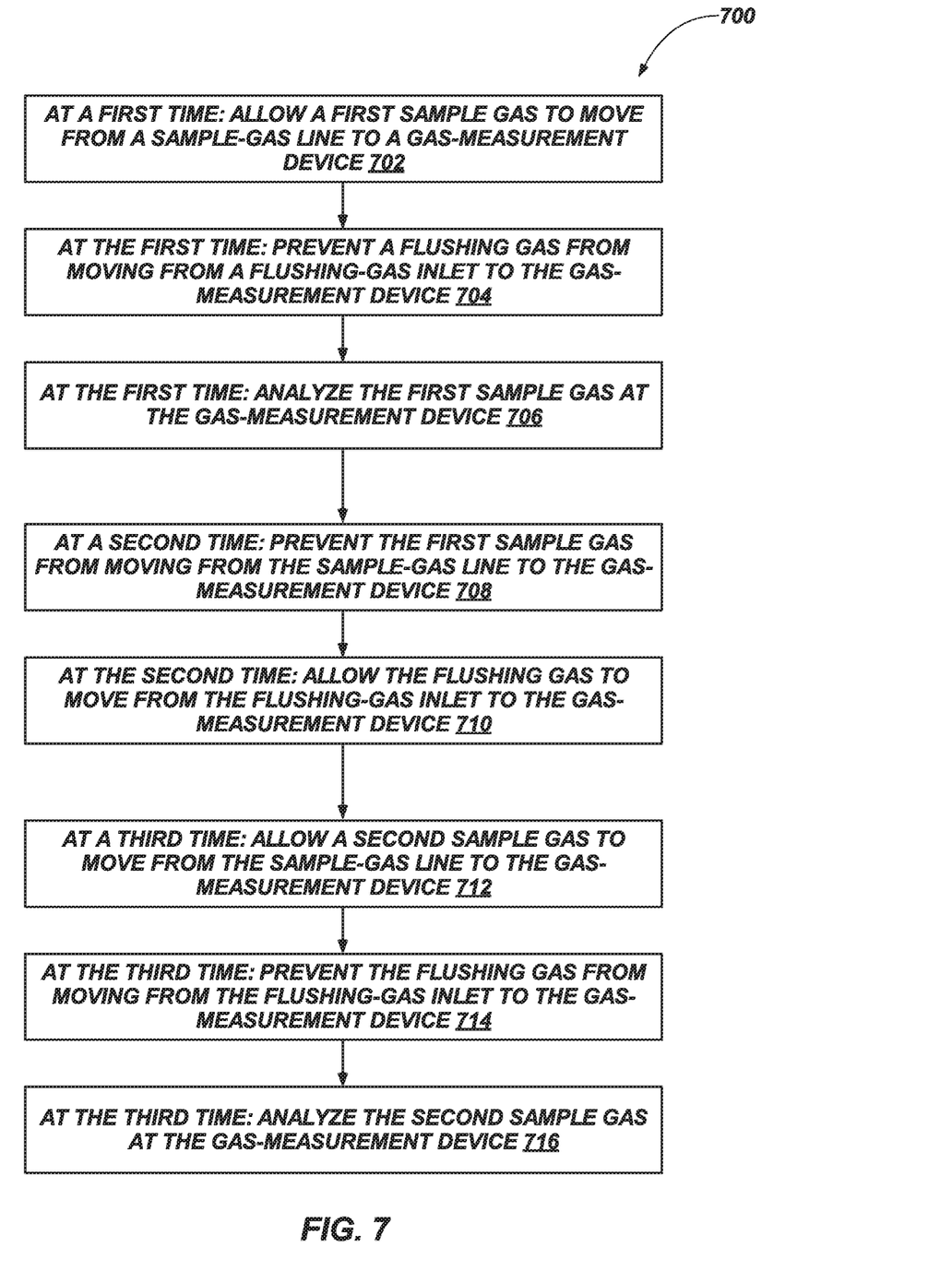
FIG. 7 is a flowchart illustrating a process in accordance with one or more embodiments of the present disclosure.

FIG. 7 is a flowchart illustrating a process 700 in accordance with one or more embodiments of the present disclosure. The described first time, second time, and third time may include a duration of time. In process 700 events described as happening during one of the first time, the second time, or the third time, may occur in any order during their respective times. Additionally, the events described as happening during one of the first time, the second time, or the third time, may occur for a duration of time during their respective times. Additionally, there may be a duration of time between the first time and the second time and/or between the second time and the third time. For example, the gas chromatograph may be allowed to stabilize between the first time and the second time, and/or between the second time and the third time. The time for stabilization may be on the order of seconds.

Prior to block 702, prior to the first, time, a first sample gas may be obtained. The first sample gas may be obtained during drilling operations, e.g., from drilling mud. Alternatively, the first sample gas may be obtained during completion operations, e.g., from or at a flowline string, a casing string. Alternatively, the first sample gas may be obtained during production operations, e.g., from a production tree. Alternatively, the first sample gas may be obtained from a calibration gas source during a calibration phase.

At block 702, at a first time, a first sample gas is allowed to move from a sample-gas line to a gas chromatograph. At block 704, at the first time, a flushing gas is prevented from moving from a flushing-gas inlet to the gas chromatograph. At block 706, at the first time, the first sample gas is analyzed at the gas chromatograph.

During the first time, a flushing system, e.g., the flushing system 202 of FIG. 2 may be configured in a testing mode of operation, e.g., as illustrated and described above with reference to FIG. 3. The first time may include a sufficient amount of time for a gas chromatograph (e.g., the gas-measurement device 102 of FIG. 2) to analyze the first sample gas. For example, the first time may include time on the order of minutes e.g., half a minute to five minutes. The first time may include a percentage of the duration of a cycle time (e.g., duration of the process 700). For example, the first time may be 5-50% of the cycle time.

At block 708, at a second time, the first sample gas is prevented from moving from the sample-gas line to the gas chromatograph. At block 710, at the second time, the flushing gas is allowed to move from the flushing-gas inlet to the gas chromatograph.

During the second time, the flushing system may be configured in a flushing mode of operation, e.g., as illustrated and described above with reference to FIG. 4. The second time may include a sufficient amount of time for the flushing gas to flush the first sample gas from the gas chromatograph. Additionally or alternatively, the third time may follow the second time by a sufficient amount of time for the flushing gas to flush the first sample gas from the gas chromatograph. For example, the second time may include time on the order of tens of seconds, e.g., ten seconds to 60 seconds.

At block 712, at a third time, a second sample gas is allowed to move from the sample-gas line to the gas chromatograph. At block 714, at the third time, the flushing gas is prevented from moving from the flushing-gas inlet to the gas chromatograph. At block 716, at the third time, the second sample gas is analyzed at the gas chromatograph.

During the third time, the flushing system, may be configured in a testing mode of operation, e.g., as illustrated and described above with reference to FIG. 3. The third time may include a sufficient amount of time for the gas chromatograph to analyze the second sample gas. For example, the third time may include time on the order of minutes e.g., half a minute to five minutes. The third time may include a percentage of the duration of the cycle time, e.g., 5-50% of the cycle time.

While the present disclosure refers to a gas-analysis system, it is also contemplated to use embodiments of the present invention in a liquid chromatography system.

As used herein, the terms "substantially" and "about" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "and/or" includes any and all combinations of one or more of the associated listed items.

While the present invention has been described herein with respect to certain embodiments, those of ordinary skill in the art will recognize and appreciate that it is not so limited. Rather, many additions, deletions, and modifications to the embodiments depicted and described herein may be made without departing from the scope of the invention as hereinafter claimed, and legal equivalents. In addition, features from one embodiment may be combined with features of another embodiment while still being encompassed within the scope of the invention as contemplated by the inventor.

What is claimed is:

1. A gas-analysis system, comprising:
a gas chromatograph comprising a column;
a sample-gas line configured to direct a flow of a sample gas to a first valve and a second valve, the flow of the sample gas defining an upstream direction and a downstream direction;
a flushing system between the sample-gas line and the column of the gas chromatograph, positioned downstream of the sample-gas line, and positioned upstream of the column of the gas chromatograph, the flushing system comprising:
a sample-gas outlet configured to move the sample gas out of the flushing system;
a flushing-gas inlet configured to direct a flushing gas to the second valve;
a testing-gas line configured to direct either the sample gas or the flushing gas to the column of the gas chromatograph;
the first valve between the sample-gas line and the sample-gas outlet, the first valve configured to either allow or prevent the sample gas to flow to the sample-gas outlet;
the second valve between the sample-gas line, the flushing-gas inlet, and the testing-gas line, positioned downstream of the sample-gas line, and positioned upstream of the testing-gas line, the second valve configured to allow the sample gas from the sample-gas line to flow to the testing-gas line while in a first valve position or allow the flushing gas from the flushing-gas inlet to flow through and flush the testing-gas line while in a second valve position; and
the gas chromatograph configured to analyze the sample gas received from the testing-gas line based on a speed at which components of the sample gas move through the column; and
a control system, the control system configured to control operation of the first valve and the second valve to configure the gas-analysis system into modes of operation, the modes of operation comprising:
a testing mode wherein the first valve is configured to prevent the sample gas from flowing from the sample-gas line to the sample-gas outlet and the second valve is in the first valve position to allow the sample gas to flow from the sample-gas line to the testing-gas line and prevent the flushing gas from flowing from the flushing-gas inlet to the testing-gas line, the testing mode comprises a testing-mode time duration; and
a flushing mode wherein the first valve is configured to allow the sample gas to flow from the sample-gas line to the sample-gas outlet and the second valve is in the second valve position to allow the flushing gas to flow from the flushing-gas inlet to the testing-gas line and prevent the sample gas from flowing from the sample-gas line to the testing-gas line, the flushing mode comprises a flushing-mode time duration,
wherein the flushing-mode time duration is shorter than the testing-mode time duration.

2. The gas-analysis system of claim 1, wherein the gas-analysis system is configured to be used above-ground, the gas-analysis system further comprising a gas-extraction unit operatively coupled to the sample-gas line, the gas-extraction unit configured to obtain the sample gas from drilling mud above-ground.

3. The gas-analysis system of claim 1, further comprising a gas-capture unit operatively coupled to the sample-gas line, and wherein the gas-analysis system and the gas-capture unit are positioned below-ground and are implemented in one or more of a flowline string, a casing string, a production string, a wireline tool, a completion tool, and a drilling tool, and the gas-capture unit is configured to obtain the sample gas below-ground.

4. The gas-analysis system of claim 1, wherein the flushing system further comprises a gas pump operatively coupled to the flushing-gas inlet, the gas pump configured to pump the flushing gas through the second valve and the testing-gas line and into the gas chromatograph while the second valve is in the second valve position.

5. The gas-analysis system of claim 1, wherein the sample gas comprises a first sample gas and a second sample gas and the control system is configured to:
configure the gas-analysis system into the testing mode to provide the first sample gas at the gas chromatograph;
instruct the gas chromatograph to analyze the first sample gas;
configure the gas-analysis system into the flushing mode to flush the first sample gas from the testing-gas line;
configure the gas-analysis system into the testing mode to provide the second sample gas at the gas chromatograph; and
instruct the gas chromatograph to analyze the second sample gas.

6. The gas-analysis system of claim 1, wherein the flushing-gas inlet includes multiple flushing-gas lines to provide multiple flushing gases.

7. The gas-analysis system of claim 1, wherein the first valve is configured to provide a calibration gas to the gas chromatograph.

8. The gas-analysis system of claim 1, wherein the flushing-mode time duration is shorter than 30 seconds and the testing-mode time duration is 30 seconds or longer than 30 seconds.

9. A method for analyzing sample gases at a gas chromatograph, the method comprising:
at a first time:
allowing a first sample gas, using a first valve and a second valve of a flushing system between a sample-gas line and a gas chromatograph, to move from the sample-gas line to a testing-gas line, the testing-gas line configured to receive the first sample gas from the second valve while the second valve is in a first position and direct the first sample gas to the gas chromatograph, the gas chromatograph comprising a column, the gas chromatograph configured to analyze a gas based on a speed at which components of the gas move through the column;
preventing a flushing gas, using the second valve, from moving from a flushing-gas inlet to the testing-gas line while the second valve is in the first position; and
analyzing the first sample gas at the gas chromatograph;
at a second time:
preventing the first sample gas, using the first valve and the second valve, from moving from the sample-gas line to the testing-gas line; and
allowing the flushing gas, using the second valve while the second valve is in a second position, to move from the flushing-gas inlet to the testing-gas line; and
at a third time:
allowing a second sample gas, using the first valve and the second valve, to move from the sample-gas line to the testing-gas line;
preventing the flushing gas, using the second valve, from moving from the flushing-gas inlet to the testing-gas line; and
analyzing the second sample gas at the gas chromatograph.

10. The method of claim 9, further comprising, prior to the first time, capturing the first sample gas below-ground, wherein analyzing the first sample gas at the gas chromatograph comprises analyzing the first sample gas while the gas chromatograph is located below-ground.

11. The method of claim 9, further comprising, prior to the first time, obtaining the first sample gas during one or more of drilling operations, completion operations, and production operations.

12. The method of claim 9, wherein the second time follows the first time by a testing-mode time duration and the third time follows the second time by a flushing-mode time duration, wherein the flushing-mode time duration is shorter than the testing-mode time duration.

13. The method of claim 12, wherein the flushing-mode time duration is shorter than 30 seconds and the testing-mode time duration is 30 seconds or longer than 30 seconds.

14. The method of claim 9, further comprising, at the second time, allowing the first sample gas to move from the sample-gas line to a sample-gas outlet through the first valve, the first valve positioned between the sample-gas line and the sample-gas outlet,
wherein allowing the first sample gas to move from the sample-gas line to the gas chromatograph at the first time further comprises decoupling the sample-gas line from the sample-gas outlet at the first valve.

15. A well-gas analysis system comprising:
a gas trap for capturing a sample gas from a well, the gas trap operatively coupled to a sample-gas line;
a gas chromatograph comprising a column, the gas chromatograph configured to analyze the sample gas based on a speed at which components of the sample gas move through the column; and
a flushing system between the sample-gas line and the gas chromatograph, the flushing system comprising:

a multi-way valve between the sample-gas line, a sample-gas outlet, a flushing-gas inlet, and a testing-gas line, the multi-way valve positioned downstream of the sample-gas line and the flushing-gas inlet and positioned upstream of the sample-gas outlet and the testing-gas line, the testing-gas line configured to direct the sample gas to the gas chromatograph, the multi-way valve configured to:

in a first position, allow the sample gas to flow from the sample-gas line to the sample-gas outlet and allow a flushing gas to flow from the flushing-gas inlet to the testing-gas line; and in a second position, prevent the sample gas from flowing from the sample-gas line to the sample-gas outlet, prevent the flushing gas from flowing from the flushing-gas inlet to the testing-gas line, and allow the sample gas to flow from the sample-gas line to the testing-gas line providing the sample gas to the gas chromatograph.

16. The well-gas analysis system of claim 15, wherein the well-gas analysis system is configured to be implemented in a downhole tool in one or more of a flowline string, a casing string, a production string, a wireline tool, a completion tool, and a drilling tool.

17. The well-gas analysis system of claim 15, wherein a flushing-mode time duration is defined while the flushing gas is allowed to flow from the flushing-gas inlet to the testing-gas line and a testing-mode time duration is defined while the sample gas is allowed to flow from the sample-gas line to the testing-gas line, and the flushing-mode time duration is shorter than the testing-mode time duration.

18. The well-gas analysis system of claim 17, wherein the flushing-mode time duration is shorter than 30 seconds and the testing-mode time duration is 30 seconds or longer than 30 seconds.

19. The well-gas analysis system of claim 15, wherein the flushing-gas inlet includes multiple flushing-gas lines to provide multiple flushing gases.

\* \* \* \* \*